United States Patent [19]
Geesen

[11] 3,784,980
[45] Jan. 8, 1974

[54] SERIALLY OPERATED COMPARISON SYSTEM WITH DISCONTINUANCE OF COMPARISON ON FIRST MISMATCH

[75] Inventor: Michel Geesen, Boulogne, France

[73] Assignee: Societe dite: Electroniques Marcel Dassault, Paris, France

[22] Filed: June 8, 1972

[21] Appl. No.: 260,812

[30] Foreign Application Priority Data

June 10, 1971 France ............................. 7121091

[52] U.S. Cl. .............................. 340/146.2, 328/134
[51] Int. Cl. ......................... G06f 7/02, H03d 13/00
[58] Field of Search ................. 340/146.2; 328/133, 328/134

[56] References Cited

UNITED STATES PATENTS

| | | | |
|---|---|---|---|
| 2,821,696 | 1/1958 | Shiowitz et al. | 340/146.2 |
| 2,910,667 | 10/1959 | Lubkin | 340/146.2 |
| 2,837,732 | 6/1958 | Nelson | 340/146.2 |
| 2,977,574 | 3/1961 | Pouliart et al. | 340/146.2 |
| 2,889,534 | 6/1959 | Lubkin | 340/146.2 |
| 3,348,199 | 10/1967 | Jorgensen | 340/146.2 |
| 3,576,533 | 4/1971 | Yokoyama | 340/146.2 |

*Primary Examiner*—Felix D. Gruber
*Assistant Examiner*—David H. Malzahn
*Attorney*—Karl F. Ross

[57] ABSTRACT

The components of a message signal to be identified are serially fed to a comparator which compares them, one at a time, with like-ranking components of a reference signal registered in a display unit. Upon detecting a match between the first components of the two signals, the comparator steps a counter to call out from the display unit the second component of the reference signal for comparison with that of the incoming message signal, and so forth. In the event of a mismatch, the counter is reset; if all components match, an output signal is given. If the signals are in binary code, the comparator is a logic circuit; if they are composed of a series of different frequencies, the comparator is a mixer.

6 Claims, 2 Drawing Figures

SERIALLY OPERATED COMPARISON SYSTEM WITH DISCONTINUANCE OF COMPARISON ON FIRST MISMATCH

The present invention relates to a device for identifying or decoding data-carrying electric signals.

The majority of conventional systems for identifying data-containing or message signals, particularly those that are binary-coded, make use of a memory unit, for example a shift register, in which the signals received are written and the contents of which are compared in their entirety with a coded reference signal as displayed by appropriate means.

Such known devices necessitate a large number of logic elements such as many comparison elements as there are components or information bits in the signals to be identified.

Further, their functioning is subject to hazards, which are the more probable the greater number of signal bits to be identified, this being due, for example, to disturbance such as noise which may effect the transmission channels.

It is an object of the invention to provide a simplified device for identifying data-carrying electric signals.

Another object of the invention is to provide means for approving the functioning of decoding apparatus by increasing the probability of decoding a correct code as opposed to decoding an incorrect code.

It is yet another object of the invention to provide a device enabling the use of messages of shorter length than at present thereby proportionally decreasing the risk of errors while at the same time providing the same degree of reliability as do systems using messages containing a large number of bits.

In accordance with my invention, a coded data carrying electric signal, particularly in binary code, is identified by comparing this signal to a coded reference signal, the bits of the signal to be identified being compared successively with bits of the same order in the reference signal, the bits of order $p$ being compared only when the bits of order $p-1$ are identical.

Thus, my improved system for decoding or recognizing a coded message signal includes a single comparator serially receiving at a first input the bits (or other components) signal and, at a second input, the output of a unit for reading the reference signal, the reading device being operated by a counter, connected to the comparator, element to introduce into the latter successively the bits (or other components) of the reference signal to be compared with like-ranking bits of the message signal.

In accordance with a more specific feature of my invention, means are provided for authorizing comparison of the bits of the reference signal with those of a message signal only at predetermined, adjustable, moments.

As a result, only the pulses or bits of the message signal occurring at the selected instants are taken into consideration, any noise signals being consequently eliminated.

Figure 1:
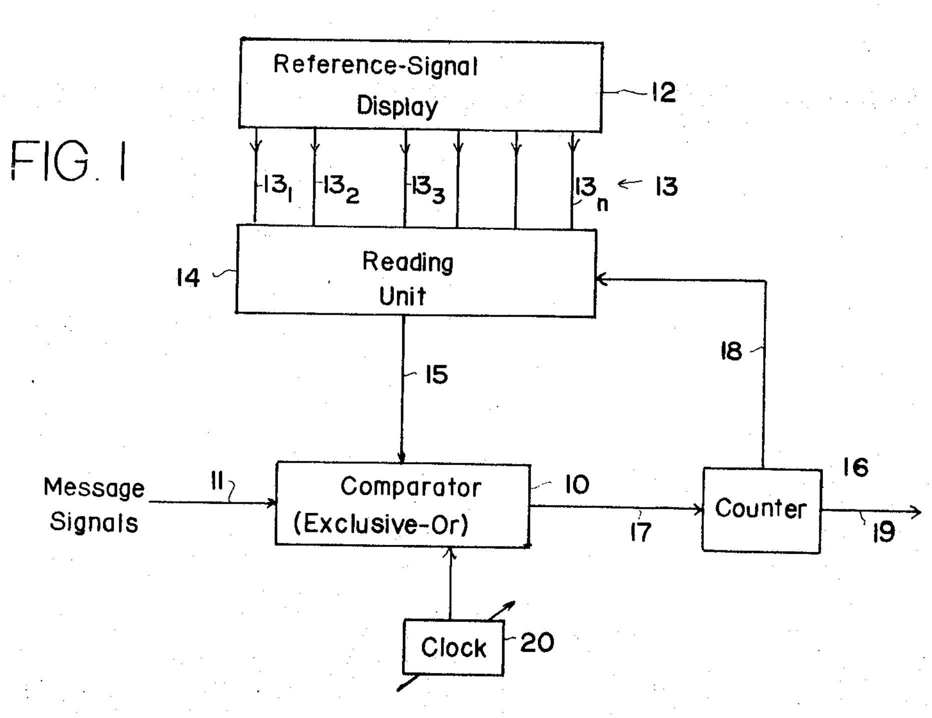
Figure 2:
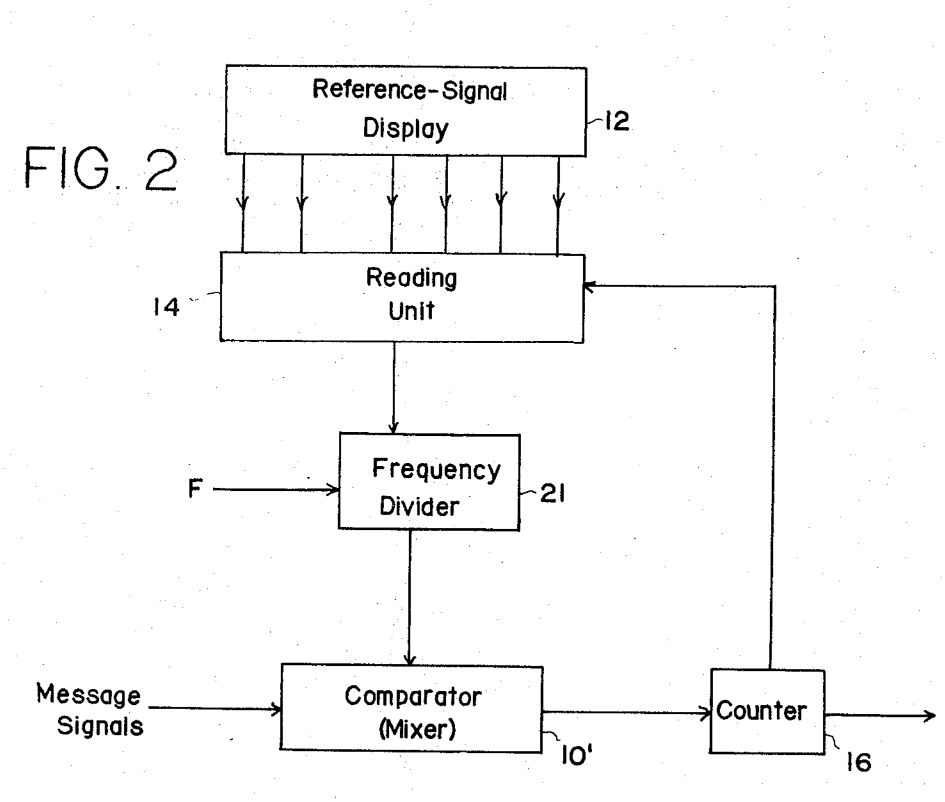

The invention will be more fully understood from the following description given for purposes of illustration with reference to the accompanying drwings in which:

FIG. 1 is a block diagram of a device for identifying data carrying signals according to the invention; and FIG. 2 is a similar diagram illustrating a modification.

The device according to the invention, as shown in FIG. 1 comprises a single comparator 10 receiving at a first input 11 the message signals to be identified and, at a second input 15, the output of a reading unit 14 connected by leads 13 to a register 12 displaying a coded reference signal.

Between comparator 10 and reading unit 14 is inserted a counter 16 receiving, at its input 17, the signals emitted by the comparator 10 and providing at its output 18 control signals for the reading unit 14.

The device shown in FIG. 1 functions in the following way:

When a message signal composed of a succession of bits reaches comparator 10 through lead 11, the comparator first compares the first bit of the incident signal with the first bit of the reference signal registered in display unit 12. Unit 12 includes a switch that successively applies the displayed bits to leads $13_1$, $13_2$, . . . $13_n$ to a lead 15. If, for example, the first bit of the registered code is "1", the value corresponding to the bit "1" is applied by lead 15 to comparator 10, constituted by a logic circuit of the exclusive-OR type. On the arrival via lead 11 of the first bit of the signal to be identified, if that bit is "1," the energization of the second input of the Exclusive-OR element receives a voltage which energizes this element and causes the appearance, on output lead 17, of a match-indicating current whereby through a lead 18, the reader 14 is stepped to interconnect the second lead $13_2$ and the lead 15. If, for example, the second bit of the registered code is "0," the corresponding voltage is then present at the first input of the Exclusive-OR element. On the arrival, via lead 11, of the second bit of the signal to be identified, if this second bit is "0," the same stepping current as before is present at comparator output 17 and counter 16, through lead 18, connects the third reference lead $13_3$ to the output 15 of reader 14. If the third bit of the registered code is "0" and, via lead 11, there arrives a third bit having the value "1," the mismatch results in the generation of a current of different value at output 17 and the counter 16, instead of advancing by one unit step, is reset to zero and also, through lead 18, sets reader 14 back to its initial state, until the arrival of a new signal to be identified.

When the displayed reference signal or code has n bits, it is only when the counter had advanced by n stages or unity steps that a singal is emitted on a lead via lead 19 indicating that the incident signal received 11 has been identified as one matching the reference signal with which it has been compared bit by bit.

In FIG. 1, I have also illustrated an adjustable clock which steps the comparator 10 to enable the bits of the incident signal to be compared with those of the reference signal only at predetermined time intervals, so that only incoming signals matching the reference code both as to timing and coding are automatically decoded or identified.

In FIG. 2, I show an embodiment for identifying signals constituted by a succession of n different frequencies, n being equal to or greater than two.

In this embodiment, the comparator, 10, is a mixer whose output generates a "1" or a "0" signal according to whether the frequency of a message-signal component matches that of a like-ranking reference-signal component.

In this embodiment, the reference code is obtained from a frequency divider 21 which subjects a frequency F, constituting a multiple of the data frequencies, to a division factor as a function of the coded reference signal registered in display unit 12.

I claim:

1. A device for identifying a coded message signal by comparing components of said message signal with respective components of a coded reference signal, comprising a single comparator serially receiving at a first input the components of a message signal to be identified, a reading unit whose output is connected to a second input of said comparator for successively feeding thereto the components of a reference signal, a counter connected to the comparator and to the reading unit, said counter advancing by one unity step only if the two compared signal components are identical and generating an output signal only when it is has counted a number equal to that of the signal components of the reference signal, and a source of said reference signal connected to said reading unit, the components of the reference signal being serially called out from said reading unit upon the stepping of said counter.

2. A device for identifying a binary-coded message signal according to claim 1, wherein the comparator is an Exclusive-OR element.

3. A device according to claim 1, further comprising timing means for operating said comparator at predetermined, adjustable moments.

4. A device according to claim 1, wherein the components of a signal differ from one another as to their frequencies.

5. A device according to claim 4, wherein the comparator is a mixer.

6. A device according to claim 5, further comprising a frequency divider between the reading unit and the mixer having means for providing a division factor as a function of the components of said reference signal.

* * * * *

7864

PO-1050
(5/69)

UNITED STATES PATENT OFFICE
CERTIFICATE OF CORRECTION

Patent No. 3,784,980 Dated 8 January 1974

Inventor(s) Michel GEESEN

It is certified that error appears in the above-identified patent and that said Letters Patent are hereby corrected as shown below:

In the heading, line [73] read the assignee's name as -- Electronique Marcel Dassault -- .

Signed and sealed this 20th day of August 1974.

(SEAL)
Attest:

McCOY M. GIBSON, JR.
Attesting Officer

C. MARSHALL DANN
Commissioner of Patents